Oct. 15, 1935.  L. MICHAELIS  2,017,700

SYNCHRONOUS MOTOR

Filed May 16, 1934

Inventor:
Lothar Michaelis,
by Harry E. Dunham
His Attorney.

Patented Oct. 15, 1935

2,017,700

UNITED STATES PATENT OFFICE 2,017,700

SYNCHRONOUS MOTOR

Lothar Michaelis, Berlin-Charlottenburg, Germany, assignor to General Electric Company, a corporation of New York Application May 16, 1934, Serial No. 725,982
In Germany June 13, 1933

5 Claims. (Cl. 172—275)

My invention relates to synchronous motors of the type having salient poles which are permanently magnetized. The motor of my invention is best suited for small motors such as those used in clocks.

In carrying my invention into effect, I prefer to magnetize the salient poles of the rotor of the motor by a permanent magnet which is positioned coaxial with the rotor. This permanent magnet does not necessarily revolve with the rotor. The motor may be bipolar or have a greater number of poles. Also the poles of the rotor may be in excess of the poles of the stator and be otherwise designed to run at a subsynchronous speed in accordance with the principle of United States Patent to Holtz, No. 1,892,552, December 27, 1932, and the rotor may carry a squirrel cage or its equivalent if desired. The permanent magnet supplies excitation to the salient poles of the rotor in a simple manner and reduces the necessary stator excitation.

Figure 4:
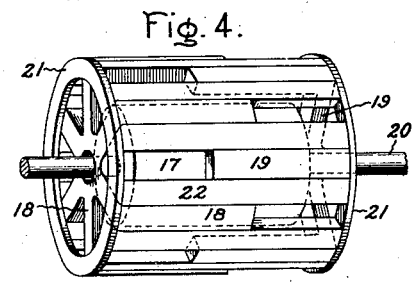
Figure 5:
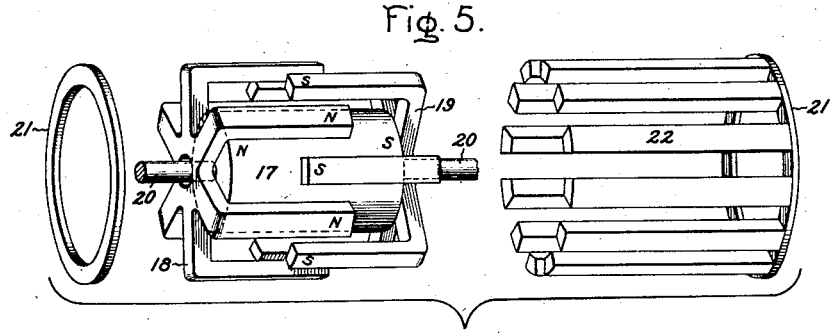

The features of my invention which are believed to be novel and patentable will be pointed out in the claims appended hereto. For a better understanding of my invention, reference is made in the following description to the accompanying drawing, Fig. 1 of which shows a side view of a bipolar motor made in accordance with my invention; Fig. 2 is a vertical, sectional view taken on line 2—2 of Fig. 1; Fig. 3 is a horizontal, sectional view taken on line 3—3 of Fig. 1; Fig. 4 represents a rotor embodying my invention having a large number of pairs of salient poles and employing a squirrel cage winding; and Fig. 5 shows the rotor of Fig. 4 with the squirrel cage elements separated from the salient pole and permanent magnet portion.

Figure 1:
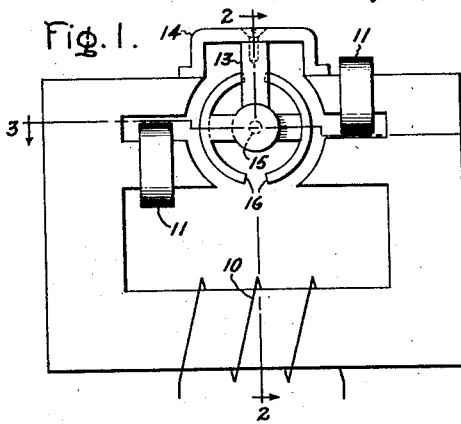
Figure 2:
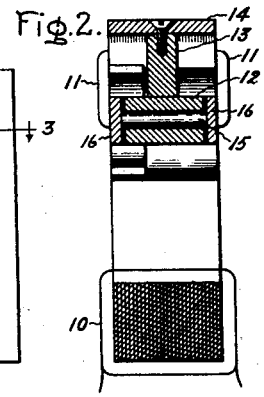
Figure 3:
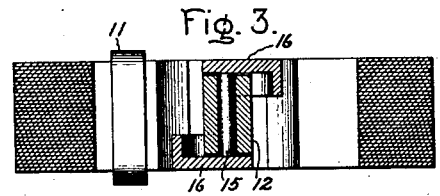

Referring now to Figs. 1 to 3, I have here shown a bipolar motor having a common form of shaded pole bipolar stator energized by a single-phase winding represented at 10. 11 represents the shading coils on the stator pole pieces. These shading coils give the flux passing between the pole pieces a rotating or shifting component as is well understood in the art.

Within the circular space between the pole pieces is a stationary cylindrically shaped permanent magnet 12. The axis of this permanent magnet is the same as the axis of the rotor to be described hereinafter, and is supported in this position by a central support 13 secured to a U-shaped strap 14 fastened between the outer surfaces of the stator pole pieces. These supporting parts 13 and 14 for the permanent magnet are preferably of non-magnetic material. The permanent magnet is preferably made of some high grade permanent magnet material. The permanent magnet thus establishes N and S pole fluxes at its two ends.

The rotor of the motor consists of a shaft 15 having a bearing on the inner surface of the permanent magnet and extending therethrough together with two L-shaped salient pole piece members 16 secured to the shaft at opposite ends of the permanent magnet and extending radially and then inwardly, parallel to the axis of rotation, into the cylindrical air gap formed between the stator pole pieces. The outer portions of these salient rotor pole pieces are sector shaped and extend over a considerable arc as illustrated, but their dimensions in an axial direction and their axial displacement are such as to leave clearance between them and the stationary supporting piece 13 so that the rotor is free to rotate, the two pole pieces passing on opposite sides of the central supporting piece 13. The pole pieces are displaced from each other 180 electrical degrees which, in this bipolar motor, is also 180 mechanical degrees. Thus, the rotor may be said to consist of a central shaft with separate spider portions extending from either end of the shaft in staggered relation and both supporting sector-shaped salient pole pieces in positions to cooperate with the stator pole pieces.

The magnetic circuit through the rotor for the stator fluxes at synchronous speed is then from one stator pole piece into the adjacent rotor salient pole through its supporting spider arm, axially through the shaft, which is of magnetic material, into the spider arm at the opposite end of the shaft, and out through the opposite salient rotor pole into the other stator pole piece. At synchronous speed the stator flux through the rotor will always be in the same direction, i. e., one rotor pole will be north and the other south, and the rotor will synchronize with a polarity determined by the permanent magnet.

The permanent magnet, coaxial with the rotor, surrounding the shaft, and extending between the spider members, performs generally the same function that a direct current exciting winding performs in known forms of synchronous motors built in large sizes. The permanent magnet supplies excitation at synchronous speed and reduces the excitation which it is necessary to supply through the single-phase stator winding. The advantages of such rotor excitation is thus available in a simple manner and it becomes feasible, by use of the invention, to employ the same in motors of very small sizes with resulting improvement in power factor, efficiency and torque.

The permanent magnet can of course rotate with the shaft, but the arrangement shown is considered to have certain advantages in that the stationary permanent magnet may serve as the rotor bearing support and the rotor is not so heavy as it would be if the permanent magnet were made a part of the rotating element.

By using sector-shaped salient pole pieces extending over a large arc, as shown, and by using shading coils on the stator poles, the motor can be made self-starting.

In Figs. 4 and 5, I have represented the invention as applied to a rotor having a large number of pairs of salient poles all excited by a single cylindrical permanent magnet centrally disposed with respect to the rotor axis. In Figs. 4 and 5, the permanent magnet core is represented by 17, having north and south poles on opposite ends as represented in the central portion of Fig. 5. At the north pole end of the permanent magnet is the integral spider and salient pole magnetic portion 18. The salient pole pieces of this part will, therefore, be magnetized as north poles. At the other or south pole end of the permanent magnet and rotor is the second magnetic spider 19 supporting salient poles, which are magnetized as south poles. The extremities of these pole pieces are bent towards each other and are partially interleaved but spaced apart to produce a system of alternate north and south poles in a cylindrical formation suitable for cooperation with a conventional form of stator not shown in Figs. 4 and 5. The salient pole pieces are sufficiently separated from the central portion of the permanent magnet to secure the proper routing of the fluxes through the rotor.

The permanent magnet 17 and salient pole members 18 and 19 may rotate as a unit or the permanent magnet may be held stationary with trunnions 20, and the salient pole members may be otherwise secured together in proper spaced relation and rotate on trunnions 20.

In the illustration of Fig. 4, the two salient pole portions are secured together in proper spaced relation by a squirrel cage winding composed of end rings 21 and connecting bars 22. The bars of the squirrel cage lie between and properly space the cylindrical system of salient pole pieces.

In Fig. 5, one end ring for the squirrel cage is represented as withdrawn to the left and the remainder of the squirrel cage as withdrawn to the right to more clearly illustrate the different parts of the construction.

This rotor will have excellent starting torque. During the starting period, when the magnetized poles of the rotor are not in synchronism with the stator fluxes, the latter will not be confined to the path which they take through the rotor at synchronous speed, but there will be more or less leakage through the rotor in a plane at right angles to the axis of the permanent magnet. The positioning of the permanent magnet with its axis at right angles to the general path taken by stator fluxes during starting aids in preventing demagnetization of the permanent magnet. The permanent magnet may be made of a heat-treated alloy composed of about 12 per cent aluminum, 20 per cent nickel from 0 up to about 10 per cent cobalt, and the remainder iron, described in William E. Ruder application, Serial No. 674,216, filed June 3, 1933, and assigned to the same assignee as the present invention. Such a permanent magnet in the rotor of my invention will not be demagnetized by the flux forces that may exist incident to motor starting and it will retain its permanent magnet properties throughout the useful life of the motor. Even a less satisfactory permanent magnet will be beneficial as it will tend to be remagnetized by the stator fluxes as soon as synchronous operation is established. Should the permanent magnet become entirely demagnetized for any reason, still the motor will operate but with less efficiency and with a lower synchronous torque.

What I claim as new and desire to secure by Letters Patent of the United States is:

1. A rotor for synchronous motors comprising an even number of salient pole pieces uniformly spaced about the circumference of a cylinder, the axis of which corresponds to the axis of rotation of the rotor, a magnetic spider member at one end of the rotor supporting alternate pole pieces and a magnetic spider at the other end of the rotor supporting the remaining pole pieces, and a stationary permanent magnet coaxial with the rotor extending between said two spider members for magnetizing the pole pieces supported thereby with opposite polarity fluxes.

2. A single-phase self-starting synchronous motor having a shaded-pole stator member and a salient-pole rotor member, a cylindrically shaped permanent magnet containing aluminum, nickel, and iron, within said rotor and coaxial with the rotor axis for supplying excitation to the salient poles of said rotor.

3. A rotor for synchronous motors comprising axially displaced magnetic spider members, each supporting a plurality of salient magnetic pole pieces evenly spaced about the axis of rotation of the motor, the salient pole pieces on one spider member being evenly spaced from and extending partially between the salient pole pieces on the other spider member, a squirrel cage winding having its bars lying between said salient pole pieces and having end rings adjacent the exterior surfaces of the spider members, and a permanent magnet coaxial with said rotor and extending between said spider members for supplying excitation to the salient magnetic poles of said rotor.

4. A synchronous motor comprising a stator member having a magnetic circuit provided with spaced pole-pieces together with an alternating current winding for producing fluxes between said pole pieces, a salient pole rotor located between said stator pole pieces and influenced by the fluxes thereof, said rotor having salient pole pieces uniformly spaced about the axis of rotation of the rotor and magnetic spider members at opposite ends of the rotor supporting alternate salient pole pieces of said rotor in axially displaced relationship, a stationary permanent magnet coaxial with the rotor extending between said spider members for magnetizing the same and the pole pieces supported thereby with opposite polarity fluxes, and a non-magnetic support for the permanent magnet securing the same in fixed relation with the pole pieces of the stator.

5. A single-phase self-starting synchronous motor having a bipolar shaded pole stator member and an induction motor secondary rotor member, said rotor member having an even number of salient magnetic pole pieces uniformly spaced about the axis of rotation of the rotor, magnetic spider members at either end of said rotor for supporting said salient magnetic pole pieces in cooperative relation with the stator pole pieces, and a permanent magnet coaxial with said rotor and extending between the spider members thereof for magnetizing alternate magnetic pole pieces of the rotor with alternate polarity fluxes.

LOTHAR MICHAELIS.